United States Patent
Bernhard et al.

(10) Patent No.: US 12,330,717 B2
(45) Date of Patent: Jun. 17, 2025

(54) STEERING SYSTEM FOR A VEHICLE

(71) Applicant: Robert Bosch GmbH, Stuttgart (DE)

(72) Inventors: Werner Bernhard, Moegglingen (DE); Sebastian Dambacher, Ruppertshofen (DE); Fabian Ferrano, Aalen (DE); Ravichandran S Thangavel, Erode (IN); Jan Schoppa, Goeppingen (DE); Frederik Schubert, Schwäbisch Gmünd (DE); Jessica Hanselmann, Täferrot (DE); Moritz Blum, Buchdorf (DE)

(73) Assignee: Robert Bosch GmbH, Stuttgart (DE)

( * ) Notice: Subject to any disclaimer, the term of this patent is extended or adjusted under 35 U.S.C. 154(b) by 701 days.

(21) Appl. No.: 17/616,067

(22) PCT Filed: Apr. 28, 2020

(86) PCT No.: PCT/EP2020/061695
§ 371 (c)(1),
(2) Date: Dec. 2, 2021

(87) PCT Pub. No.: WO2021/001079
PCT Pub. Date: Jan. 7, 2021

(65) Prior Publication Data
US 2022/0315096 A1  Oct. 6, 2022

(30) Foreign Application Priority Data
Jul. 4, 2019 (DE) .................... 10 2019 209 895.9

(51) Int. Cl.
*B62D 5/04* (2006.01)
*F16C 35/04* (2006.01)

(52) U.S. Cl.
CPC ......... *B62D 5/0448* (2013.01); *B62D 5/0403* (2013.01); *F16C 35/042* (2013.01); *F16C 2326/24* (2013.01)

(58) Field of Classification Search
CPC .. B62D 5/0448; B62D 5/0403; F16C 2326/24
See application file for complete search history.

(56) References Cited

U.S. PATENT DOCUMENTS

| 6,378,646 B1 | 4/2002 | Bugosh |
| 2004/0067809 A1 | 4/2004 | Hoersch et al. |

(Continued)

FOREIGN PATENT DOCUMENTS

| CN | 1738983 A | 2/2006 |
| CN | 102529753 A | 7/2012 |

(Continued)

OTHER PUBLICATIONS

International Search Report corresponding to PCT Application No. PCT/EP2020/061695, mailed Jul. 9, 2020 (German and English language document) (5 pages).

*Primary Examiner* — Jacob D Knutson
(74) *Attorney, Agent, or Firm* — Maginot, Moore & Beck LLP

(57) ABSTRACT

A steering system for a vehicle includes a transmission cover on a steering gear housing. The cover is arranged adjacent to a bearing part. The side surface of the bearing part facing the transmission cover forms a support surface for the transmission cover.

11 Claims, 3 Drawing Sheets

(56) References Cited

U.S. PATENT DOCUMENTS

2004/0108676 A1    6/2004  Bareis
2007/0251758 A1* 11/2007  Segawa ................ F16H 1/16
                                                           180/444
2015/0274193 A1* 10/2015  Saito ................... F16C 33/20
                                                           74/422

FOREIGN PATENT DOCUMENTS

| | | | | |
|---|---|---|---|---|
| CN | 102717827 A | 10/2012 | | |
| DE | 103 10 492 A1 | 9/2004 | | |
| DE | 10 2008 001 958 A1 | 12/2009 | | |
| DE | 102013006432 A1 * | 10/2014 | ........... | B62D 5/0448 |
| DE | 10 2014 117 082 A1 | 5/2016 | | |
| DE | 102015110599 A1 * | 1/2017 | | |
| EP | 0 419 925 A1 | 4/1991 | | |
| EP | 1457405 A1 * | 9/2004 | ........... | B62D 5/0424 |
| EP | 2 049 383 B1 | 6/2007 | | |
| EP | 1 873 041 A1 | 1/2008 | | |
| JP | 2005-29013 A | 2/2005 | | |

* cited by examiner

STEERING SYSTEM FOR A VEHICLE

This application is a 35 U.S.C. § 371 National Stage Application of PCT/EP2020/061695, filed on Apr. 28, 2020, which claims the benefit of priority to Serial No. DE 10 2019 209 895.9, filed on Jul. 4, 2019 in Germany, the disclosures of which are incorporated herein by reference in their entirety.

The disclosure relates to a steering system for a vehicle, with a transmission rod in a steering gear housing and with a bearing part in the steering gear housing for mounting the transmission rod.

BACKGROUND

DE 10 2008 001 958 A1 describes an electric steering system for a vehicle, which electric steering system has a steering gear in a steering gear housing, in which a transmission rod is mounted such that it can be moved axially and is driven by an electric servomotor. A gear cover is placed onto the steering gear housing, on which gear cover a radial flange is integrally formed as carrier of the electric servomotor.

A comparable electric steering system is also known from EP 049 383 B1. The gear cover which is placed onto the steering gear housing and is held via screws has supporting stops, between which a radial bearing is fixed in an axially positively locking manner.

SUMMARY

The steering system according to the disclosure can be used in vehicles, for example in passenger cars and in trucks. The steering system is preferably configured as an EPS (Electric Power System) steering system, in the case of which a servo torque is generated by means of an electric servomotor which is a constituent part of the steering system for steering force assistance. The steering movement of the driver is transmitted via a steering shaft to a steering gear with a transmission rod which carries out an axial actuating movement and actuates the steerable wheels of the vehicle. The transmission rod is, for example, a steering track rod. The electric servomotor is seated on the steering gear housing and drives the transmission rod which is mounted in the steering gear housing. A bearing part which is received in the steering gear housing belongs to the mounting of the transmission rod.

Moreover, a gear cover which is arranged adjacently with respect to the bearing part is received on the steering gear housing. The gear cover and the bearing part form two separate components which are preferably not connected to one another. In an alternative embodiment, it is also possible for the gear cover and the bearing part to be connected to one another.

In the case of the steering system according to the disclosure, that side face of the bearing part which faces the gear cover forms a supporting face for the gear cover. This embodiment of the steering system has the advantage that the bearing part and the gear cover can be optimized for their respective intended purpose on account of their separate configuration. The gear cover is relieved of bearing forces which act on the bearing part. During normal operation, accordingly, no bearing forces act on the gear cover. Accordingly, the gear cover can be manufactured from a material with a comparatively low strength and with a low weight. In particular, an embodiment of the gear cover made from a plastic material comes into question. The gear cover can optionally also be manufactured from a metal, for example from aluminum, a thin-walled embodiment of the gear cover being sufficient for weight saving.

It can be expedient for the gear cover to be arranged in or on the steering gear housing in relation to the bearing part in such a way that, in the case of the forces which occur during normal driving operation, there is no contact between the gear cover and the bearing part. As an alternative, it is also possible that the gear cover makes contact with the bearing part in the installed position, the installation advantageously taking place in such a way that, during normal operation, no forces or merely low forces act between the bearing part and the gear cover.

The support of the gear cover on the bearing part can take place in exceptional situations if exceptionally high forces act on the steering system, for example in the case of the maximum steering lock angle being reached with force. The forces which act here on the transmission rod have to be absorbed by the steering gear housing and can lead to a deformation which results in contact between the gear cover and the supporting face on the bearing part. The deformation of the gear cover, in particular in the embodiment of the gear cover as a plastic component, is limited by way of the stop on the supporting face of the bearing part. The deformation as a rule lies in the linear elastic range and assumes its original shape again after the cessation of the external forces, with the result that there is no permanent deformation of the gear cover. The gear cover can absorb high loads and forces on account of the support of the gear cover on the supporting face of the bearing part.

The bearing part advantageously consists of a metal material which is capable of absorbing high bearing forces and possibly supporting forces of the gear cover, for example consists of steel. The gear cover is preferably manufactured from a different material than the bearing part, and can be configured, in particular, as a thin-walled component and/or can be manufactured from a material with a relatively low strength, in particular from a plastic material.

In accordance with a further advantageous embodiment, the gear cover is fixed without a screw connection on the steering gear housing. Instead, the fixing can take place via a latching connection, via which a positively locking connection to the steering gear housing is achieved. This makes it possible, during assembly, for the gear cover to be placed onto the steering gear housing without the use of tools, and for a fixed connection to the steering gear housing to be achieved via the latching connection and positively locking connection.

In accordance with a further advantageous embodiment, on the side which faces the bearing part, the gear cover has a supporting structure which is, in particular, part of a reinforcing structure on the gear cover. The supporting structure encloses an opening in the gear cover in an annular way, through which opening the transmission rod is guided. It can be expedient here, in particular, that the annular supporting structure delimits the opening in the gear cover and therefore reaches directly as far as the opening. The supporting structure makes full-area support of the gear cover on the supporting face of the bearing part possible in the case of high external forces which act axially on the gear cover. The supporting structure can extend over a large part of a side face of the gear cover.

In accordance with a further advantageous embodiment, the reinforcing structure is configured on the gear cover in the form of a honeycomb structure. In the embodiment of the gear cover as a plastic component, the honeycomb structure can be produced in the course of the injection molding of the gear cover. As an alternative to a honeycomb structure, other reinforcing structures also come into question, for example ribs which can possibly run in a crisscross manner.

In accordance with a further advantageous embodiment, the bearing part is configured as a bearing disk, through which the transmission rod is guided and on which the transmission rod is supported. In a further embodiment, the bearing part is configured as a bearing segment disk which extends over an angular segment of preferably less than 180°, for example over an angular segment of 90°. It can be expedient for at least two bearing segment disks to be arranged distributed over the circumference, for example two bearing segment disks which lie diametrically opposite one another at the same level axially, between which bearing segment disks the transmission rod runs.

The bearing disk or the bearing segment disk is preferably fixed via a screw connection on the steering gear housing.

BRIEF DESCRIPTION OF THE DRAWINGS

Further advantages and expedient embodiments can be gathered from the further claims, the description of the figures and the drawings, in which:

DETAILED DESCRIPTION

In the figures, identical components are provided with identical designations.

Figure 1:
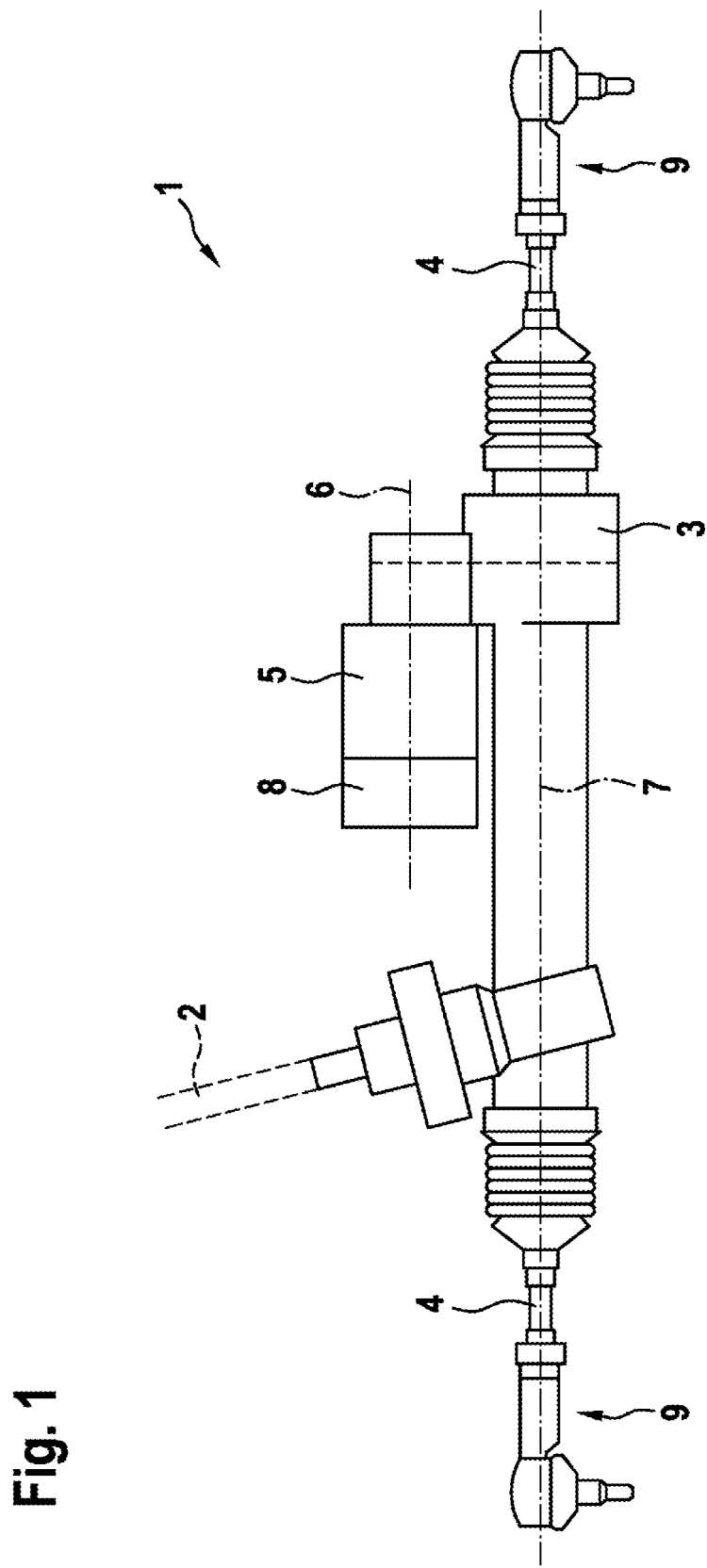
FIG. 1 shows a diagrammatic illustration of a steering system for a vehicle.

FIG. 1 shows by way of example an electrically assisted steering system 1 for a vehicle. The steering system 1 comprises a steering shaft 2, via which a steering angle which is specified by the driver via the steering wheel is transmitted, a steering gear housing 3 with a steering gear which is received therein, and a steering linkage with a transmission rod 4 which forms a steering track rod and via which the steering movement is transmitted to the steerable wheels of the vehicle. An electric steering or servomotor 5 serves to assist the manual torque which is applied by the driver, which steering or servomotor 5 generates a servo torque which is fed into the steering gear in the steering gear housing 3. In the exemplary embodiment, the electric servomotor 5 is arranged axially parallel to the transmission rod 4, and the motor shaft longitudinal axis 6 of the servomotor 5 runs parallel to the longitudinal axis 7 of the transmission rod 4. The electric servomotor is configured, for example, as an electronically commutated synchronous or asynchronous motor. The servomotor 5 is actuated via a connected control unit 8.

At its two outer ends, the transmission rod 4 is connected in each case to a steering track rod 9, via which a wheel suspension system is actuated.

Figure 2:
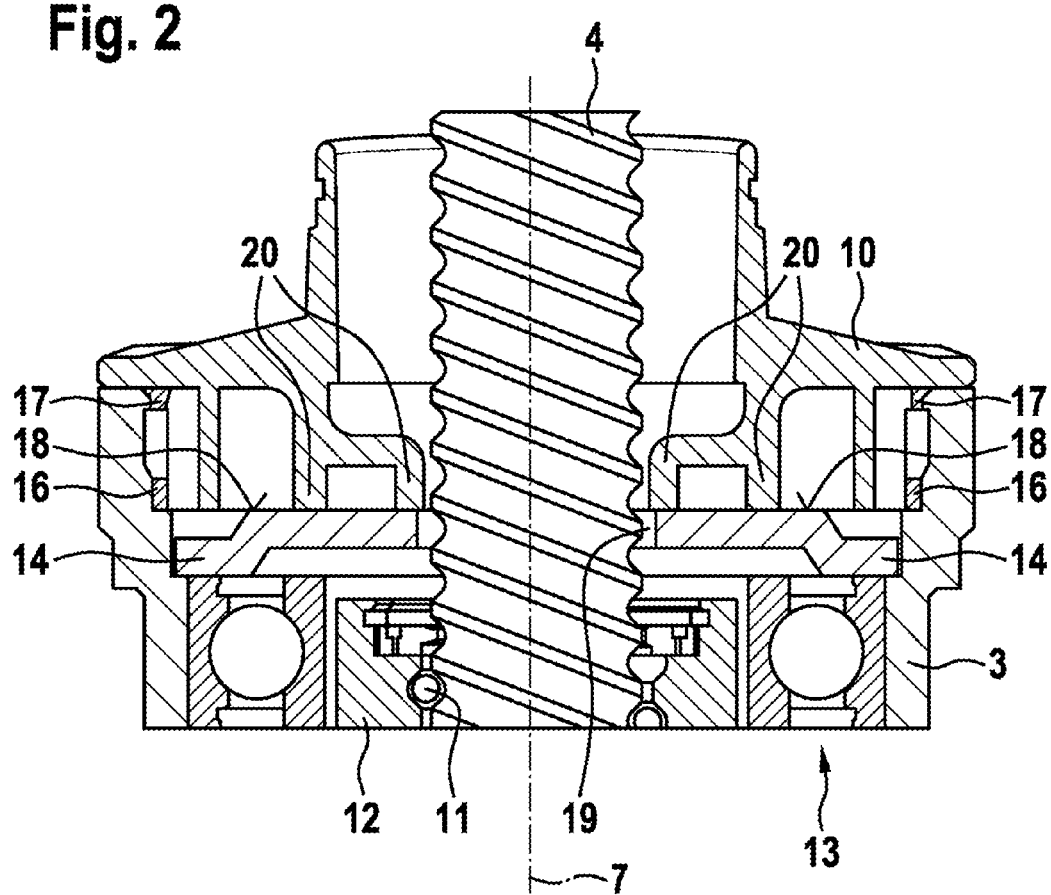
FIG. 2 shows a section longitudinally through the steering gear housing of the steering system in the region of a gear cover.
Figure 4:
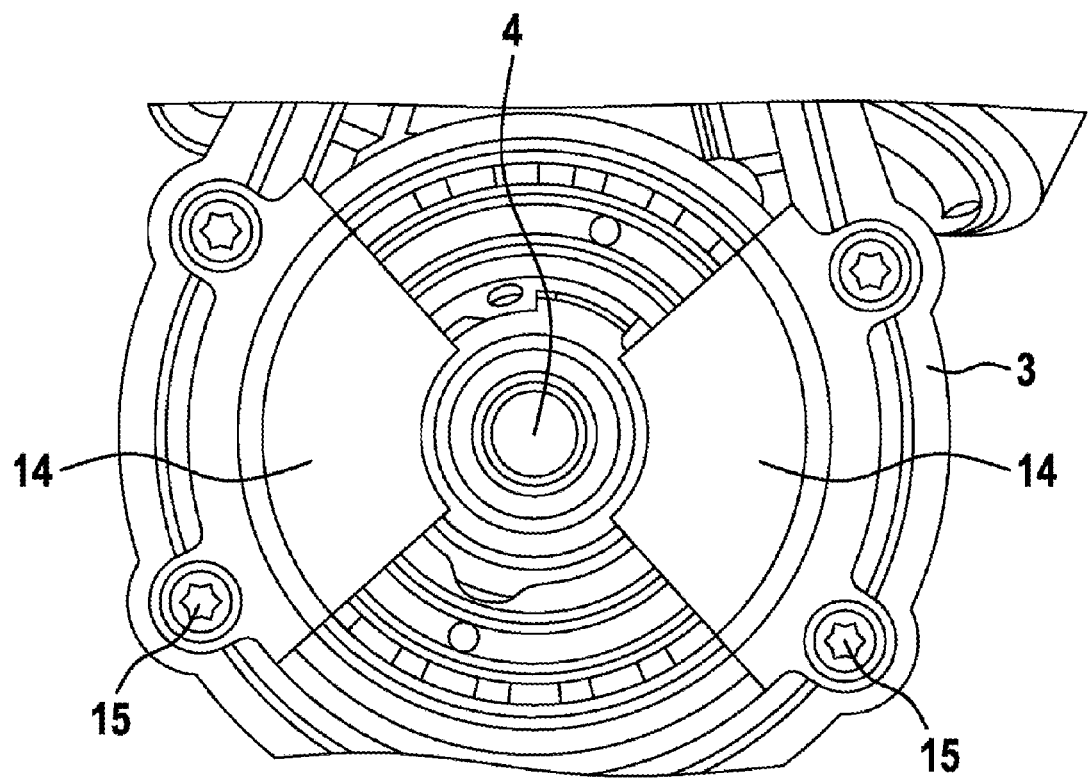
FIG. 4 shows a top view of two bearing segment disks which are arranged so as to lie diametrically opposite one another on the steering gear housing.

FIG. 2 shows the gear housing 3 in longitudinal section in the region of a gear cover 10. The transmission rod 4 is connected by way of a transition member to the electric servomotor via a ball screw drive, consisting of a ball screw 11 between the transmission rod 4 and a ball nut 12 which is arranged such that it can be rotated about the transmission rod 4. The ball nut 12 is mounted radially in a radial bearing 13 which is received in the steering gear housing 3. The radial bearing 13 is supported axially on two bearing segment disks 14 which are connected fixedly via screws 15 (FIG. 4) to the steering gear housing 2. The bearing segment disks 14 extend over an angular segment of 90° and consist, for example, of steel. The bearing segment disks 14 which lie diametrically opposite one another and are arranged axially at the same level enclose a clearance between them, through which clearance the transmission rod 4 is guided.

As an alternative to bearing segment disks, round bearing disks also come into question.

Figure 3:
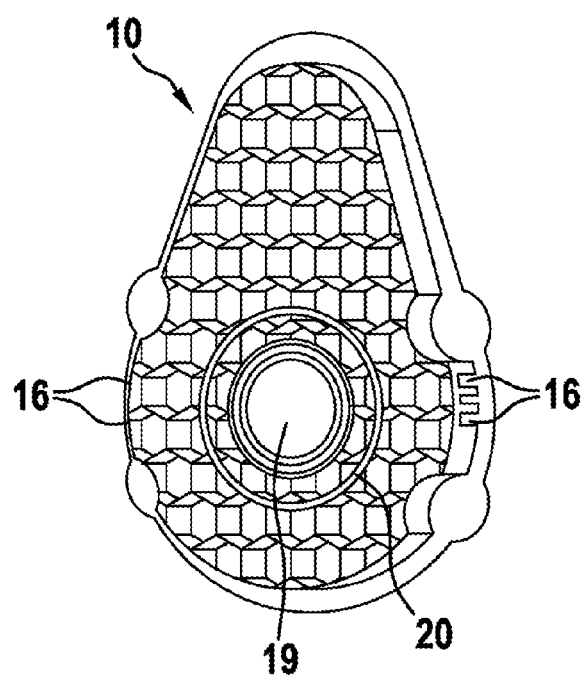
FIG. 3 shows the gear cover in a perspective view.

The gear cover 10 which is shown perspectively in FIG. 3 is configured as a plastic component and is placed onto the end side of the steering gear housing 3. The gear cover 10 is connected via a latching connection in an axially positively locking manner to the steering gear housing 3. A screw connection of the gear cover 10 on the steering gear housing 3 or another component is not provided. The latching connection takes place via latching elements 16 which are arranged on diametrically opposite sides in each case in the side region of the gear cover 10. When the gear cover 10 is placed axially onto the steering gear housing 3, the latching elements 16 on the gear cover 10 latch with associated latching members 17 which are situated on the end side of the steering gear housing 3.

The bearing segment disks 14, which in each case form a bearing part, and the gear cover 10 are configured as discrete components which are independent of one another and are not connected to one another. That side face of the bearing segment disks 14 which faces the gear cover 10 forms supporting faces 18, on which the gear cover 10 can be supported. During normal operation, the gear cover 10 bears merely loosely against the supporting face 10 on the bearing segment disks 14, with the result that no axial forces or merely low axial forces act between the gear cover 10 and the bearing segment disks 14. Under the effect of high external forces, however, it is possible that, in particular, the gear cover 10 is deformed, and that the gear cover 10 is supported on the supporting face 18 of the bearing segment disks 14 with relatively high axial forces. Said relatively high axial forces can readily be absorbed by the bearing segment disks 14, and can be transmitted to the steering gear housing 3.

On its side which faces the bearing segment disks 14, the gear cover 10 has a honeycomb-shaped reinforcing structure which encloses and delimits in an annular manner a central opening 19 which is made in the gear cover 10. FIG. 3 uses auxiliary lines to show the supporting and reinforcing structure 20 which encloses the opening 19 in an immediately annular manner. As can be gathered from FIG. 2, the end side of the reinforcing structure 20 is supported on the supporting face 18 of the bearing segment disks 14 in the immediate vicinity of the central opening 19. In the case of high external forces which act on the gear cover 10, the support prevents a permanent, plastic deformation of the gear cover 10 which preferably consists of plastic.

The invention claimed is:
1. A vehicle comprising:
  a steering system comprising:
    a steering gear housing;
    a transmission rod arranged in the steering gear housing;
    a bearing part arranged in the steering gear housing, the bearing part mounting the transmission rod; and
    a gear cover received on the steering gear housing and arranged adjacent to the bearing part such that a side face of the bearing part facing the gear cover forms a supporting face for the gear cover, wherein, on a side which faces the bearing part, the gear cover has a supporting structure which delimits a central opening in the gear cover for the transmission rod and in which the supporting structure includes a reinforcing structure of the gear cover which encloses the central opening.

2. The vehicle of claim 1, wherein said bearing part includes two bearing segment disks, each subtending an angle of 90° of said circumference and disposed diametrically opposite each other.

3. The vehicle of claim 1, wherein said bearing part includes two bearing segment disks, each subtending an angle of less than 180° of said circumference.

4. A steering system for a vehicle, comprising:
a steering gear housing;
a transmission rod arranged in the steering gear housing;
a bearing part arranged in the steering gear housing, the bearing part mounting the transmission rod; and,
a gear cover received on the steering gear housing and arranged adjacent to the bearing part such that a side face of the bearing part facing the gear cover forms a supporting face for the gear cover, wherein, on a side which faces the bearing part, the gear cover has a supporting structure which delimits a central opening in the gear cover for the transmission rod and in which the supporting structure includes a reinforcing structure of the gear cover which encloses the central opening.

5. The steering system of claim 4, wherein said bearing part includes two bearing segment disks, each subtending an angle of 90° of said circumference and disposed diametrically opposite each other.

6. The steering system as claimed in claim 5, wherein the gear cover comprises a plastic material.

7. The steering system as claimed in claim 5, wherein the gear cover is fixed on the steering gear housing without a screw connection.

8. The steering system as claimed in claim 5, wherein the gear cover is fixed on the steering gear housing via a latching connection.

9. The steering system as claimed in claim 5, wherein the bearing part is configured as a bearing disk.

10. The steering system as claimed in claim 5, wherein the bearing part is configured as a bearing segment disk.

11. The steering system of claim 5, wherein said bearing part includes two bearing segment disks, each subtending an angle of less than 180° of said circumference.

* * * * *